Sept. 30, 1969     W. F. DAHL     3,469,492

PRE-LOAD INDICATOR

Filed July 11, 1967

INVENTOR.
WARREN F. DAHL

BY

Curtis, Morris & Safford
ATTORNEYS

United States Patent Office 3,469,492
Patented Sept. 30, 1969

3,469,492
PRE-LOAD INDICATOR
Warren F. Dahl, Philadelphia, Pa., assignor to Standard Pressed Steel Co., Jenkintown, Pa., a corporation of Pennsylvania
Filed July 11, 1967, Ser. No. 652,543
Int. Cl. F16b *31/02;* G01d *21/00*
U.S. Cl. 85—62          5 Claims

ABSTRACT OF THE DISCLOSURE

A method and device for indicating a predetermined load on a fastener wherein a piece of extrudable sheet material is placed under the reacting surface of a threaded fastener, such as a bolt or nut, so that when the desired value of induced load is reached the sheet material will be extruded from under the seating surface and sheared off.

BACKGROUND OF THE INVENTION

In using threaded fasteners, such as bolts, it is often desirable to have the fastener preloaded to a particular installation tension. The tension on the bolt should be sufficient to keep the connection under the desired compressive force and for many applications this load tension should be as close as possible to the yield point of the fastener bolt without exceeding it. In any event, the load tension should not be so great as to exceed the yield point of the bolt and cause the bolt to break or strip the threads of the bolt or deform or mutilate the material parts being fastened.

Prior methods that have been used to determine the desired preload tensioning to be applied to a threaded fastener have included the use of a torque wrench for applying, to the bolt or nut, a torque value which is calculated to develop a desired load tension in the bolt shank. The torque wrench has associated with it a measuring device to measure the magnitude of the torque applied. This method results in rather poor accuracy because of the many variables which may be encountered such as variation in frictional resistance, allowable thread tolerances, surface conditions including materials and lubrication, tolerances of the nut, washer and fitting surfaces, and temperature differences at the time of applying the torque to the fastener.

Other methods have been employed that involve the use of various types of frangible washers and indicating type washers which either rupture at the desired preload tension, or in some manner indicate, by a visibly colored indicating means, the preload tension that is being applied. These devices, while generally more effective than a torque wrench, involve a considerable manufacturing expense since these various frangible washers and colored indicating washers are quite complex and involve complicated manufacturing techniques. When used in large quantities, for any particular application, the cost of using these prior indicating washers is often prohibitive. Further, some of these prior art devices, because they remain under the bearing surface of the fastener, cause a load loss in the joint after the tensioning force is removed due to a tendency of the indicator material to creep and relax after a certain period of time or exposure to varying temperature conditions.

It is therefore an object of the present invention to provide an improved method and device for indicating a preload on a fastener.

Another object is to provide a method and device for indicating when a predetermined tensioning force has been applied to a threaded fastener.

A further object of the present invention is to provide an economically feasible method and device for indicating a predetermined preload tension on a threaded fastener.

A still further object of the present invention is to provide a preload indicator for a fastener which causes no load loss after the indicated load is reached and the load tension is removed.

SUMMARY OF THE INVENTION

Briefly, in accordance with one embodiment of the present invention, a thin plastic sheet material such as polyethylene is inserted beneath the head of a bolt or nut or beneath a washer used in conjunction with the bolt or nut. When the fastener is tightened to a predetermined tension, the sheet material will be extruded and sheared off. The particular tension to be applied can be varied by varying the bearing surface area in contact with the sheet material.

BRIEF DESCRIPTION OF THE DRAWING

Other objects, advantages and aspects of the invention will appear from the following detailed description when taken in conjunction with the accompanying drawing in which.

DESCRIPTION OF THE PREFERRED EMBODIMENTS

Figure 1:
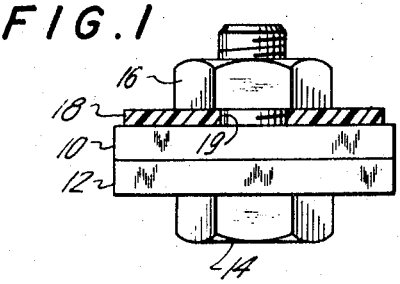
FIGURE 1 is a partial sectional view, before the application of any tension, of one embodiment of the present invention.

Referring now to the embodiment of the invention shown in FIGURES 1 through 4 there is shown an overlapping joint of plate members 10 and 12 joined by threaded bolt 14 and secured by threaded nut fastener 16. Placed between the threaded nut 16 and plate member 10 is a sheet 18 of pliable plastic or rubber like material, for example, polyethylene, polypropylene, polytetrafluoroethylene or nylon.

Figure 2:
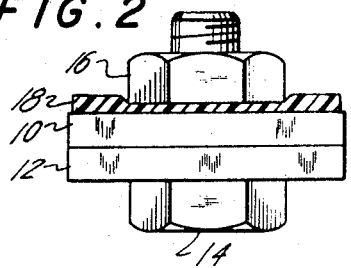
FIGURE 2 is a partial sectional view of the embodiment of FIGURE 1 showing a first step of partial application of load tension.

FIGURE 2 shows the joint of FIGURE 1 after an initial application of tightening tension and it can be noted that the sheet material 18 has begun to deform and extrude radially outward from the shank in the area immediately below the nut 16.

Figure 3:
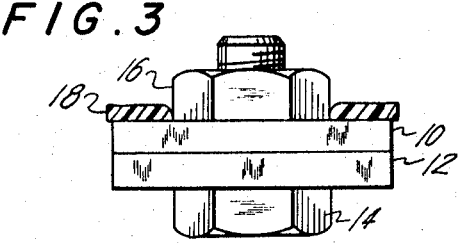
FIGURE 3 is a sectional view similar to FIGURES 1 and 2 showing the sheet material after it has been extruded and sheared.

FIGURE 3 shows the joint of FIGURE 1 after the sheet material 18 has been almost completely extruded from beneath the nut 16 and has been sheared off at the peripheral edge of nut 16. It is to be noted that while almost all of the indicating sheet will be extruded a small portion of the sheet may remain near the bolt shank. The portion of the sheet material remaining is minimal and as a result there is essentially metal-to-metal contact between the nut 16 and the plate member 10 thus assuring positive adherance and minimizing the probability of creep and relaxation of the load tension in the joint.

Figure 4:
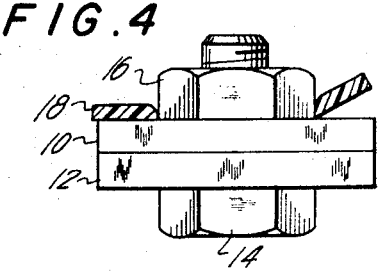
FIGURE 4 is a view similar to FIGURE 3 showing the sheared sheet material being removed.

FIGURE 4 shows the final step of removing the excess sheet material 18 after the joint has been completely secured by application of the desired preload tension. At this point the desired predetermined load tension has been reached and can be determined by visual inspection or sensed by feeling the now freed indicating sheet. Further, certain types of materials used for the indicating sheet create an audible pop when they are sheared off and thus also provide an audible indication of when the desired load tension has been reached.

The surface area of engagement with the indicating sheet 18, i.e., the bearing surface between the nut 16 and plate member 10, is proportional to the magnitude of load tension necessary to extrude and shear off the indicating sheet. Thus, the size of the bearing surface area in contact with the indicating sheet must be selected to correspond with the predetermined tension desired on the fastener so that the sheet will be sheared off when the predetermined tension has been applied. Further variations in the desired stress level may be obtained by selecting sheet materials of differing hardness and extrudability thus requiring a greater or lesser load tension, depending on the material selected, to cause extrusion and shearing of the indicating sheet.

Figure 5:
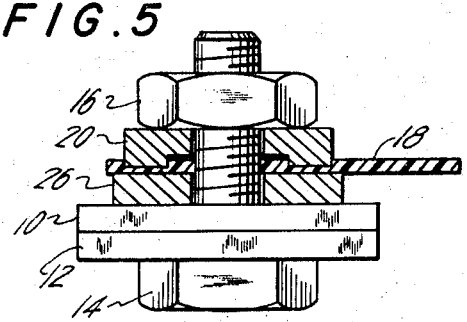
FIGURE 5 is a partial sectional view of another embodiment of the present invention before the application of any preload tension.
Figure 6:
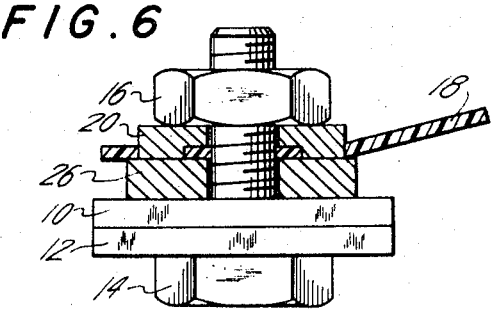
FIGURE 6 is a view similar to FIGURE 5 showing the embodiment of FIGURE 5 after the sheet material has been sheared and is being removed.

While generally effective for most applications, the embodiment shown in FIGURES 1 through 4 can be affected by variations in the bearing area and surface finish of the fastener or joint and may be affected by variations in the peripheral sharpness and flatness of the bearing surfaces. Therefore, where a high degree of accuracy is essential, the embodiment shown in FIGURES 5 to 7, may be preferred. In the embodiment shown in FIGURES 5 to 7, overlapping plate members 10 and 12 are secured as in the first embodiment by the threaded bolt 14 and nut 16. Between the nut 16 and plate member 10 is a compression washer 20 having a bore 22 therein to receive the threaded shank of bolt 14 and a counterbore 24 on one side thereof to allow for internal expansion of the extruded sheet material. A base washer 26 having a bore 28 to receive the threaded shank of bolt 14 completes the assembly and the sheet material 18 is fitted between compression washer 20 and base washer 26. FIGURE 5 shows the joint assembly before the application of any tightening tension and FIGURE 6 shows the same joint after the desired preload tension has been applied and the sheet material 18 has been extruded and sheared and is partially removed. Note that in this embodiment the sheet material has been allowed to extrude internally into the counterbore 24 in the compression washer 20 and this allows more of the sheet material 18 to be removed from between the mating surfaces of washers 20 and 26 assuring almost complete metal-to-metal contact.

The advantages to this particular embodiment lie in the fact that the compression washer 20 and base washer 26 provide the bearing surface to extrude and shear the plastic material 18. Thus these two elements may be more highly machined to provide a uniformly smooth bearing surface and may also be of varying sizes to provide bearing surfaces of different areas to vary the preload tension to be applied. Therefore, with the same threaded bolt 14 and nut 16, varying preload tensions may be applied by selecting appropriately larger or smaller compresion and base washers. Further, the compression and base washers are not deformed in any way and are thus reusable for many applications.

Figure 7:
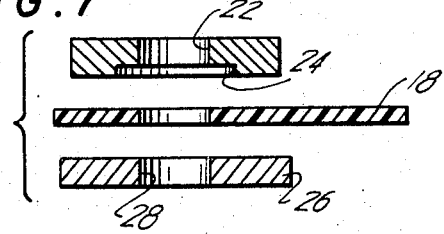
FIGURE 7 is an exploded sectional view showing the two bearing washers and sheet material of the embodiment of FIGURE 5.
Figure 8:
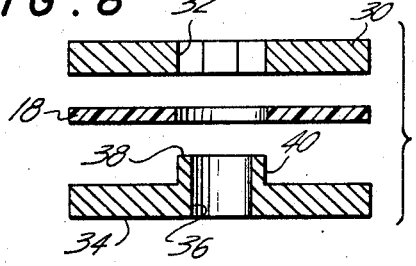
FIGURE 8 is an exploded sectional view similar to FIGURE 7 of still another embodiment of the present invention.

The embodiment shown in FIGURE 8 is similar to the embodiment of FIGURES 5 to 7 but in this embodiment compression washer 30 has an internal opening in the shape of a twelve-point studded surface. Base washer 34 has an internal bore 36 to accommodate the threaded shank of bolt 14 and a raised annular collar 38 whose exterior circumference 40 is of the twelve-point variety to securely mate with compression washer 30 and prevent relative rotation between the base washer 34 and compression washer 30. This embodiment provides a still higher degree of accuracy in that relative rotation between the compression washer 30 and base washer 34 is obviated so that the sheet material 18 between the washers cannot wrinkle and tear merely because of any rubbing of one washer moving relative to the sheet material. While any irregular circumference may be employed to obviate relative rotation, a circular bearing surface is preferred to provide for a uniform extrusion.

Thus, it may be seen that the present invention provides a convenient and economically feasible method for determining a predetermined load tension on a threaded fastener. By selection of a bearing area, which may be changed by increasing or decreasing the outside and/or inside diameter, or by selecting an appropriate sheet material, various stress levels of predetermined load can be obtained.

Figure 9:
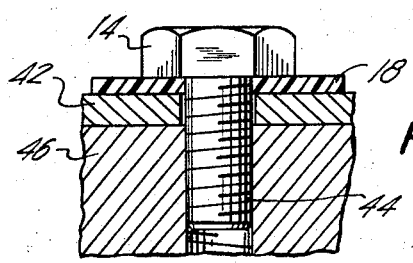
FIGURE 9 is a partial sectional view of an alternate application of the embodiment of FIGURE 1.

Various modifications are apparent; for example, the nut 16 may be eliminated and the threaded bolt 14 may be threadedly engaged in a threaded bore in one of the elements to be fastened, as shown in FIGURE 9. There it can be seen that the sheet material 18 is below the head of bolt 14. The shank of the bolt passes through the sheet material and plate member 42 into a threaded hole 44 in receiving element 46. Upon tightening of bolt 14 the sheet material 18 is extruded and sheared in the same manner discussed above.

It is also to be noted that the use of a lubricant in conjunction with the indicating sheet facilitates extrusion of the sheet material and reduces variations in frictional forces between the bearing surface and the indicating sheet to provide for a more uniform extrusion.

Further, while essentially flat bearing surfaces on the nut or washer are most commonly use, it is to be noted that a slightly concave surface may also be used with equally good results.

While certain preferred embodiments of the present invention have been specifically illustrated and described, it will be understood that the invention is not limited thereto, as variations will be readily apparent to those skilled in the art.

What is claimed is:
1. A method for visually indicating a predetermined load tension in the threaded fastener joint comprising:
   placing an indicating sheet material between one element of the threaded fastener member and a bearing surface of said joint,
   applying a continuously increasing load tension to said fastener sufficient to deform and extrude said indicating sheet material radially outward from between said one element of the threaded fastener member and the bearing surface of said joint by continual application of said load tension and cause said sheet material to be sheared at the periphery of said one element of said threaded fastener and said bearing surface, and
   discontinuing application of said load tension when said indicating sheet material has been thus sheared off.

2. The method of claim 1 wherein said indicating sheet is a material selected from the group consisting of polyethylene, polypropylene, polytetrafluoroethylene and nylon.

3. In a joint to be loaded to a predetermined stress level, a fastener element having a seating surface,
   means to engage said fastener,
   an indicating sheet between said seating surface and the opposing surface of said joint, whereby upon application of the load tension of said fastener, said sheet deforms and at least partially extrudes radially outward and ultimately shears off when said predetermined load is reached, means between said seating surface of said fastener and said opposing surface to provide a bearing surface for deforming, extruding and shearing said indicating sheet material, said means for providing a bearing surface including a base washer concentrically disposed about the shank of said fastener, a compression washer concentrically disposed above the shank of said fastener, said base washer including a central raised annular collar, having an exterior surface with a non-circular outer periphery, and said compression washer having an internal bore to matingly receive said non-circular outer periphery of said raised annular collar to thereby prevent relative rotation between said base washer and said compression washer.

4. A combination as defined in claim 3 wherein said compression washer includes an annular cavity adjacent said fastener shank to allow said indicating sheet to partially extrude radially inward.

5. The combination of claim 3 wherein said indicator sheet is a material selected from the group consisting of polyethylene, polypropylene, polytetrafluoroethylene and nylon.

References Cited

UNITED STATES PATENTS

| 2,643,904 | 6/1953 | Wehmanen. | |
| 3,021,747 | 2/1963 | Garrett | 85—62 |
| 3,104,645 | 9/1963 | Harrison | 85—62 |
| 3,153,974 | 10/1964 | Cannino | 85—62 |

EDWARD C. ALLEN, Primary Examiner

U.S. Cl. X.R.

116—114